(12) United States Patent
Schumacher

(10) Patent No.: US 6,273,214 B1
(45) Date of Patent: Aug. 14, 2001

(54) GEAR ARRANGEMENT WITH LUBRICANT SUPPLY

(75) Inventor: Heinz-Günter Schumacher, Eichelhardt (DE)

(73) Assignee: Eichelhardter Werkzeug-und Maschienenbau GmbH, Eichelhardt (DE)

( * ) Notice: Subject to any disclaimer, the term of this patent is extended or adjusted under 35 U.S.C. 154(b) by 0 days.

(21) Appl. No.: 09/433,649

(22) Filed: Nov. 3, 1999

(51) Int. Cl.[7] .................................................. F01M 11/02
(52) U.S. Cl. ............................................. 184/6.12; 475/11
(58) Field of Search .................................. 184/6.12, 6.18, 184/6.5, 105.3; 475/11, 335; 74/606 R

(56) References Cited

U.S. PATENT DOCUMENTS

| | | | | |
|---|---|---|---|---|
| 1,468,040 | * | 9/1923 | Smith ................................. | 184/105.3 |
| 1,648,862 | * | 11/1927 | Petite ................................. | 184/105.3 |
| 1,737,567 | * | 12/1929 | Buehler .............................. | 184/6.12 |
| 1,901,972 | * | 3/1933 | Kreidel .............................. | 184/105.3 |
| 2,842,226 | * | 7/1958 | Liebel ................................ | 184/6.12 |
| 3,604,617 | * | 9/1971 | Patterson ........................... | 74/606 R |
| 3,637,049 | * | 1/1972 | Butterfield ......................... | 184/6.12 |
| 4,227,427 | * | 10/1980 | Dick ................................... | 184/6.12 |
| 4,344,507 | * | 8/1982 | Osborne ............................ | 184/6.12 |
| 4,355,542 | * | 10/1982 | Tsutsumi et al. .................. | 184/6.12 |
| 4,706,636 | * | 11/1987 | Davis ................................. | 123/557 |
| 4,766,857 | * | 8/1988 | Laine et al. ........................ | 184/6.5 |
| 4,800,771 | * | 1/1989 | Edwards et al. ................... | 184/6.18 |
| 4,813,291 | * | 3/1989 | Schumacher, II et al. ........ | 475/11 |
| 5,080,198 | * | 1/1992 | Rice ................................... | 184/105.3 |
| 5,474,152 | * | 12/1995 | Wilkinson et al. ................ | 184/6.12 |
| 5,669,844 | * | 9/1997 | Homan et al. ..................... | 184/6.12 |
| 5,989,143 | * | 11/1999 | Bell et al. .......................... | 184/6.12 |

* cited by examiner

Primary Examiner—David A. Bucci
Assistant Examiner—Chong H. Kim
(74) Attorney, Agent, or Firm—Harness, Dickey & Pierce, P.L.C.

(57) ABSTRACT

A gear arrangement (1) with a lubricant supply for driving agricultural equipment has a first gearbox (2) with a first casing portion (5) which limits a first interior space (6). A second gearbox (3) with a second casing portion (7), which limits a second interior space (8) is connected with said first gearbox (2). A connecting channel (27) connects the two gearboxes (2, 3) so that lubricant in the first interior space (6) flows into the second interior space (8). The gear arrangement (1) further includes a connection mechanism (33) to supply lubricant to the two gearboxes (2, 3). The connecting channel (27) is arranged such that the lubricant in the first gearbox (2) flows through the connecting channel (27) into the second gearbox (3) when the lubricant exceeds a minimum filling level (30). An air-venting unit (34) in the form of a channel is provided in the first gearbox (2). During filling of fresh lubricant into the the first gearbox (2), the air-venting unit (34) prevents excess pressure produced in the interior spaces (6, 8).

7 Claims, 1 Drawing Sheet

GEAR ARRANGEMENT WITH LUBRICANT SUPPLY

BACKGROUND OF THE INVENTION

The invention relates to lubricant supply to a gear arrangement for driving or drives in agricultural equipment.

Planetary gears are generally used for converting rotational movement into a translatory movement. Ordinarily, the design includes a rotor with a large diameter, into which a crank is inserted. A pumping effect is created due to the vibration produced by the moved masses. The vibrations can lead to leaks in the gearbox. Due to the vibration, the use of a gearbox with gears running in an oil bath is nearly impossible. This is especially true since leaks are rarely noticed when using a gearbox in agricultural equipment. Thus, the gearbox runs hot and is damaged or even destroyed. Up-to-now trials to seal the interior space of a gearbox, which is filled with lubricant oil, to the outside, have failed. Thus, gearboxes are lubricated with a lubricant which is more viscid than oil.

To drive a horizontally running planetary gear by vertically running drives, as for example a V-belt, cog belt or a chain, an angle drive is arranged in front of the planetary gear. This is appropriately arranged together with the planetary gear in a casing. Due to this design, the problem arises as to how to supply the lubricant to each stressed part of both gearbox parts, without arranging a plurality of connectors to lubricate the gearbox. A further problem is that the user does not know what amount of lubricant the gear arrangement requires. This can lead to an excess of lubricant in the gearbox. Excess lubricant again leads to overheating of the gear arrangement which, in turn, attacks the seals. Because of the excess, the lubricant exits the gearbox at undesired places.

SUMMARY OF THE INVENTION

An object of the present invention is to provide a gear arrangement comprising two gearboxes and a lubricant supply, which is simple in design. The design enables lubrication of all the moving parts and prevents undesired exiting of lubricant.

According to the invention, a gear arrangement has a first gearbox. The first gearbox has a first casing portion delimiting a first interior space. The first gear box also includes at least a first shaft with a first gear. The first shaft has an end which projects from the first casing portion. The first gearbox, as well, has a second gear. A second gearbox has a second casing portion, delimiting a second interior space. The second gearbox has at least a second shaft. The second shaft has one end projecting into the first interior space of the first casing portion. The second gear of the first gearbox is connected to the second shaft. A third shaft is present with a third gear and a fourth gear. A connecting channel is in the second shaft to couple the first interior space with the second interior space. A connecting mechanism selectively feeds lubricant into the first interior space of the first casing portion. An air-venting unit communicates with the first interior space and with the ambient environment. The first casing portion is arranged above the second casing portion and is filled at least up to a minimum filling level with a pasty lubricant. The air-venting unit is arranged above the minimum filling level of the first casing portion. Also, an inlet opening of the connecting channel is in the first interior space arranged at the height of the minimum filling level.

An advantageous event in this embodiment is that the lubricant of the first interior space passes into the second interior space through the connecting channel. The inlet opening of the connecting channel is arranged in the first gearbox in such a way that a predetermined minimal amount of lubricant is always present in the first gearbox. Only the first gearbox is lubricated in predetermined intervals. The amount of lubricant which exceeds the minimum filling level, reaches the second gearbox through the connecting channel. The second gearbox is below the first and is supplied with lubricant through said connecting channel. The air-venting unit presents an effective pressure compensation between the ambient environment of the gearbox and the interior space. The air-venting unit prevents an excess pressure in the first interior space when it is freshly refilled with lubricant. The lubricant is pressed directly and unmeasured through the connecting channel into the second gearbox.

According to a further embodiment, the connecting channel, which connects the first interior space of the first gearbox with the second interior space of the second gearbox, is formed as a throughbore in the second shaft. The second shaft has a front face which is arranged in the first interior space. The inlet opening of the throughbore is arranged in the front face of the second shaft. The inlet opening is arranged in the first interior space. The throughbore opens to the second interior space. The front face of the second shaft is arranged above the engagement area of the first gear with the second gear. As the first gear box is refilled with lubricant, the filling level rises above the front face of the second shaft. Thus, the lubricant can pass into the throughbore, and flows into the second interior space of the second gearbox.

In a further improvement, the air-venting unit comprises a channel. The channel communicates with the first interior space of the first gearbox and with the ambient environment. A filter element is inserted from the outside into the opening of the channel which opens to the ambient environment. The opening of the channel to the ambient environment is arranged to point vertically downwards. The opening of the channel to the gearbox is arranged above the minimum filling level of the lubricant. This embodiment prevents rain, water or dirt from entering the angle drive. Also, it prevents the lubricant from exiting from the first interior space, through the channel, to the ambient environment.

The first casing also has a cowl in the form of a pyramid frustum. The connecting mechanism, which supplies lubricant to the gear arrangement is in the pyramid. This design provides many variation possibilities for the attachment of a connecting mechanism, depending on the installation environment of the gearbox. Further, the cowl and the air-venting unit may form part of the cover. The cover is stationarily connected to the first casing portion.

In a realization of the invention, the first gearbox is formed as an angle drive. In the second gearbox is in the form of a planetary drive. The first gearbox and the second gearbox form a unit. Thus, this embodiment provides a horizontal rotational movement which can be converted into a translatory horizontal movement.

From the following detailed description, taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
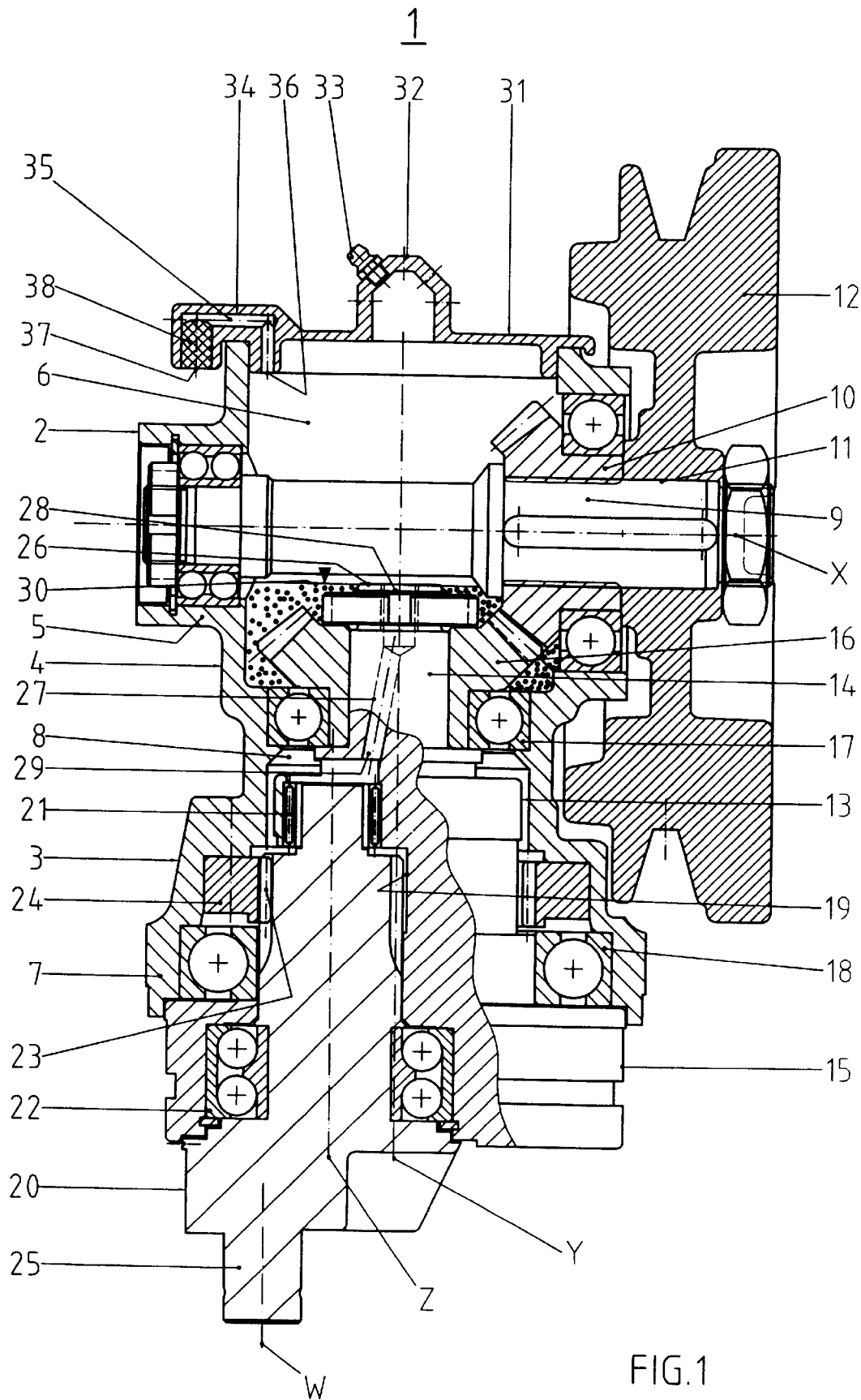
FIG. 1 is a vertical cross-section view through a combined gear arrangement, with an angle drive and a planetary gear in accordance with the present invention.

The gear arrangement 1 includes a first gearbox 2 in the form of an angle drive and a second gearbox 3 in the form of a planetary drive. The first gearbox 2 is arranged above the second gearbox 3. The two gearboxes are in one joint casing 4. The casing 4 has a first casing portion 5 and a second casing portion 7. The first casing portion 5 is allocated to the first gearbox 2 and delimits a first interior space 6. The second casing portion 7 is allocated to the second gearbox 3 and delimits a second interior space 8.

The first gearbox 2 includes a first shaft 9 centrally arranged on a first axis of rotation x. A first gear 10, in the form of a bevel gear, is fast with the first shaft 9. The first shaft 9 has a shaft end 11. Shaft end 11 projects from the first casing portion 5 and includes an attached pulley 12. The first gearbox 2 includes a second bevel gear 16. The second bevel gear 16 is stationarily connected to a second shaft 13. The first gear 10 and the second gear 16 intermesh within the first casing portion 5.

A second shaft 13 is centrally arranged on a second axis of rotation y. The second shaft 13 has a trunnion 14. The second gear 16 is connected to the trunnion 14. A rotor 15 is connected at the other end of the second shaft 13. The first axis of rotation x and the second axis of rotation y are at a right angle and intersect one another. The trunnion 14 of the second shaft 13 is positioned in the first interior space 6 of the first casing portion 5. The rotor 15 of the second shaft 13 is positioned in the second interior space 8 within the second casing portion 7. The second shaft 13 is furthermore rotatably supported by a first rolling member 7 in the first casing portion 5 or in the transition area between the first and second casing portions. A second rolling member bearing 18 rotatably supports the second shaft 13 in the second casing portion 7 around the second axis of rotation y.

The rotor 15 has a bore 19. A third shaft 20, in the form of a crankshaft, is centrally arranged on a third axis of rotation z. The third axis of rotation z is parallel to the second axis of rotation y. The second and third axes of rotation y, z are arranged in one plane. The third shaft 20 is rotatably supported by a third rolling member bearing 21. The rolling member bearing 21 is in the form of a needle bearing. Also, a fourth rolling member bearing 22 is in the rotor 15 around the third axis of rotation z, relative to the rotor 15, supporting the third shaft 20. The third shaft 20 includes a third gear 23 engaging a fourth gear 24. The fourth gear 24 is stationarily connected to the second casing portion 7.

The third shaft 20 has a crank 25, which is centrally arranged on an axis w. The axis w is parallel to the second axis of rotation y. The rotational movement of the pulley 12 of the first gearbox 2 is transformed into a linear movement of the crank 25 of the second gearbox 3. The lower end of the rotor 15 and the crank 25 of the third shaft 20 project from the second casing portion 7.

The trunnion 14 of the second shaft 13 has a front face 26. The front face 26 is arranged above the engagement area of the first and second gear 10 and 16 in the first interior space 6 of the first casing portion 5. A connecting channel 27 is arranged in the trunnion 14 of the second shaft 13. The connecting channel 27 is a throughbore with an inlet opening 28 and an outlet opening 29. The inlet opening 28 is arranged in the front face 26 of the trunnion 14 and communicates with the first interior space 6. The outlet opening 29 communicates with the bore 19 of the rotor 15 in which bore 19 the third shaft 20 is supported. Also, the outlet opening 29 communicates with the second interior space 8.

The first interior space 6 is filled with a lubricant up to at least a minimum filling level 30. The minimum filling level 30 nearly lies on the same level as the front face 26 of the second shaft 13, and thus in the inlet opening 28. The second gear 16 of the first gearbox 2 always runs in the lubricant and transmits the lubricant to the first gear 10. If further lubricant is added, it flows through the connecting channel 27 of the trunnion 14, through the bore 19 of the rotor 15, and into the second interior space 8. The third rolling member bearing 21 is the first to be provided with fresh lubricant. The lubricant exits at the lower side of the third rolling member bearing 210. The lubricant flows to the bottom, where the third and fourth gears 23 and 24 are lubricated. Lastly, the lubricant exits the second rolling member bearing 18.

The first casing portion 5 has a cover 31 on the upper side of the first gearbox 2. This cover has a cowl 32. A connecting mechanism 33 to supply lubricant to the gear arrangement 1 is coupled with the cowl 32. The cowl 32 has a pyramid frustum shape. Thus, many variation possibilities are given for attachment of a connecting mechanism 33. A lubricating nipple forming the connecting mechanism 33, as shown, may be used to supply lubricant depending on the installation environment of the gear arrangement.

To avoid excess pressure which is produced while introducing the lubricant under pressure into the first interior space 6, existing air in the first interior space 6 must be enabled to escape. An air-venting unit 34 is provided to enable air to escape from the interior space 6. The air-venting unit 34 is arranged in the cover 31 of the first casing portion 5. The air-venting unit 34 has a channel 35. The channel 36 includes an opening 36 to the interior of the gearbox and an opening 37 to the environment. A filter element 38 is inserted into the opening 37 from the outside environment. The opening 37 of the channel 35 to the environment is positioned such that the opening 37 points vertically downward in direction. This design prevents rain, water or dirt from entering into the first gearbox 2. The opening 36 to the interior of the gearbox communicates with the first interior space 6. Opening 36 is arranged above the minimum filling level 30 of the first gearbox 2. This arrangement prevents lubricant from exiting the first gearbox 2.

As shown in FIG. 1, the casing 4 is integrally formed and includes the first casing portion 5 and the second casing portion 7. Cover 31 is on the upper side of first casing portion 5. A variation in design could provide for the two casing portions 5, 7 to be rigidly connected to each other. Here, a separate cover is not needed. Accordingly, the connecting mechanism 33, as well as the air-venting unit 34, would be positioned in the upper wall of the first casing portion 5.

While the above detailed description describes the preferred embodiment of the present invention, the invention is susceptible to modification, variation and alteration without deviating from the scope and fair meaning of the subjoined claims.

What is claimed is:

1. A gear arrangement for driving or drives in agricultural equipment and machines, comprising:
   a first gearbox having a first casing portion delimiting a first interior space, at least one first shaft with a first gear, an end of said first shaft projecting from the first casing portion, a second gear positioned in said first casing portion;
   a second gearbox having a second casing portion delimiting a second interior space, at least one second shaft, one end of said second shaft projecting into the first interior space of the first casing portion, said end of said second shaft coupled with the second gear of the first gearbox;

a third shaft with a third gear and a fourth gear positioned in said second casing portion, said third shaft being rotatably supported in a bore in the second shaft;

a connecting channel in the second shaft connecting the first interior space with the second interior space, said connecting channel having an inlet opening communicating with the first interior space and an outlet opening communicating with the second interior space and the bore;

a connecting mechanism for selectively feeding lubricant into the first interior space of the first casing portion;

an air-venting unit communicating with the first interior space and with the ambient environment;

the first casing portion arranged above the second casing portion, said first casing portion filled with a pasty lubricant at least up to a minimum filling level, and said air-venting unit arranged above the minimum filling level of the first casing portion;

said inlet opening in said connecting channel in the first interior space is arranged at the height of the minimum filling level.

2. The gear arrangement according to claim 1, wherein the connecting channel connecting the first interior space of the first gearbox with the second interior space of the second gearbox being a throughbore in the second shaft, said second shaft having a front face arranged in the first interior space, wherein the inlet opening of the throughbore is arranged in the front face of the second shaft in the first interior space, and the throughbore opens to the second interior space.

3. The gear arrangement according to claim 2, wherein the front face of the second shaft is arranged above the engagement area of the first gear with the second gear.

4. The gear arrangement according to claim 1, wherein the air-venting unit includes a channel communicating with the first interior space of the first gearbox and with the ambient environment, a filter element inserted from the outside into a first opening of said channel to the environment, wherein said channel opening points vertically downward in direction and a second opening of the channel to the gearbox is arranged above the minimum filling level of the lubricant.

5. The gear arrangement according to claim 1, wherein the first casing portion has a cowl in the form of a pyramid frustum, said connecting mechanism coupled with said pyramid frustum.

6. The gear arrangement according to claim 5, wherein the cowl and the air-venting unit form part of a cover of the first casing portion.

7. The gear arrangement according to claim 1, wherein the first gearbox is formed as an angle drive and the second gearbox as planetary gear, said first gearbox and the second gearbox forming one unit.

* * * * *